United States Patent
Liu et al.

(10) Patent No.: US 9,881,200 B2
(45) Date of Patent: Jan. 30, 2018

(54) SELF-CAPACITIVE FINGERPRINT RECOGNITION TOUCH SCREEN, MANUFACTURING METHOD THEREOF, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Weijie Zhao, Beijing (CN); Shengji Yang, Beijing (CN); Hongjuan Liu, Beijing (CN); Liguang Deng, Beijing (CN); Changfeng Li, Beijing (CN); Wei Liu, Beijing (CN)

(73) Assignees: BOE Technology Group Co., LTD, Beijing (CN); Beijing BOE Optoelectronics Technology Co., LTD, Beijing (CN)

( * ) Notice: Subject to any disclaimer, the term of this patent is extended or adjusted under 35 U.S.C. 154(b) by 0 days.

(21) Appl. No.: 15/104,337

(22) PCT Filed: Jan. 5, 2016

(86) PCT No.: PCT/CN2016/070090
§ 371 (c)(1),
(2) Date: Jun. 14, 2016

(87) PCT Pub. No.: WO2016/180045
PCT Pub. Date: Nov. 17, 2016

(65) Prior Publication Data
US 2017/0124381 A1    May 4, 2017

(30) Foreign Application Priority Data

May 11, 2015   (CN) .......................... 2015 1 0236390

(51) Int. Cl.
*G06K 9/00*  (2006.01)
*G06K 9/74*  (2006.01)
*G06F 3/044* (2006.01)

(52) U.S. Cl.
CPC .......... *G06K 9/00087* (2013.01); *G06F 3/044* (2013.01); *G06K 9/0002* (2013.01); *G06F 2203/04103* (2013.01)

(58) Field of Classification Search
None
See application file for complete search history.

(56) References Cited

U.S. PATENT DOCUMENTS

2008/0055809 A1    3/2008  Miyazawa
2015/0187707 A1*   7/2015  Lee ...................... H01L 23/562
                                                               324/663
(Continued)

FOREIGN PATENT DOCUMENTS

CN        101819496 A      9/2010
CN        102236189 A     11/2011
(Continued)

OTHER PUBLICATIONS

First Office Action dated Jan. 6, 2016 issued in corresponding Chinese Application No. 201510236390.7.
(Continued)

*Primary Examiner* — Randolph I Chu
(74) *Attorney, Agent, or Firm* — Nath, Goldberg & Meyer; Joshua B. Goldberg

(57) ABSTRACT

The present invention provides a self-capacitive fingerprint recognition touch screen, a manufacturing method thereof, and a display device comprising the self-capacitive finger-
(Continued)

print recognition touch screen. The self-capacitive fingerprint recognition touch screen comprises a plurality of fingerprint recognition electrodes, and a plurality of connecting lines which are respectively electrically connected to the plurality of fingerprint recognition electrodes directly. The connecting lines are used for transmitting driving signals and detection signals needed by the fingerprint recognition electrodes.

9 Claims, 5 Drawing Sheets

(56) References Cited

U.S. PATENT DOCUMENTS

| | | | | |
|---|---|---|---|---|
| 2015/0324625 A1* | 11/2015 | Mo | | G06F 21/32 382/124 |
| 2015/0332080 A1* | 11/2015 | Du | | G06K 9/00033 382/124 |
| 2016/0314333 A1* | 10/2016 | Chiang | | G06K 9/0002 |
| 2016/0314334 A1* | 10/2016 | He | | G06K 9/0012 |
| 2017/0024598 A1* | 1/2017 | Chiang | | G06K 9/0002 |
| 2017/0061194 A1* | 3/2017 | Chiang | | G06K 9/0002 |
| 2017/0103246 A1* | 4/2017 | Pi | | G06K 9/001 |

FOREIGN PATENT DOCUMENTS

| | | |
|---|---|---|
| CN | 203084698 U | 7/2013 |
| CN | 103492991 A | 1/2014 |
| CN | 104536630 A | 4/2015 |
| CN | 104808886 A | 7/2015 |
| JP | 2005156291 A | 6/2005 |

OTHER PUBLICATIONS

Second Office Action dated Jun. 30, 2016 issued in corresponding Chinese Application No. 201510236390.7.

International Search Report dated Mar. 31, 2016 issued in corresponding International Application No. PCT/CN2016/070090 along with an English translation of the Written Opinion of the International Searching Authority.

* cited by examiner

SELF-CAPACITIVE FINGERPRINT RECOGNITION TOUCH SCREEN, MANUFACTURING METHOD THEREOF, AND DISPLAY DEVICE

This is a National Phase Application filed under 35 U.S.C. 371 as a national stage of PCT/CN2016/070090, filed Jan. 5, 2016, an application claiming the benefit of Chinese Application No. 201510236390.7, filed May 11, 2015, the content of each of which is hereby incorporated by reference in its entirety.

FIELD OF THE INVENTION

The present invention relates to the field of touch technology, and particularly relates to a self-capacitive fingerprint recognition touch screen, a manufacturing method thereof, and a display device.

BACKGROUND OF THE INVENTION

FIG. 1 is a schematic diagram illustrating principle of fingerprint touch. As shown in FIG. 1, an emission source 1 emits a high-frequency signal (e.g. a high-frequency current of above 1 MHz) to a driving electrode 5, the driving electrode 5 couples said signal to a skin layer of a finger, and correspondingly different sensing currents will be generated because the skin of the finger has ridges and valleys and capacitances C1 of a valley and a ridge are different. Then, a detection terminal 2 at a rear end detects a difference between the sensing currents to determine the valleys and the ridges, and a fingerprint of the finger is acquired through analysis executed by a computing unit (e.g. a computer).

FIG. 2 is a schematic diagram of a fingerprint recognition touch screen in the prior art. In the fingerprint recognition touch screen in the prior art, as shown in FIG. 2, a pixel electrode also serves as a fingerprint recognition electrode. Therefore, each fingerprint recognition electrode 4 needs to be connected, through a thin film transistor, to a gate line 6 and a data line 7 intersecting with each other.

In the prior art, the sensing current is detected in the following way: the gate lines 6 are turned on row by row, and sensing currents of the fingerprint recognition electrodes 4 are detected by the data lines 7 column by column, so as to acquire fingerprint information. However, fingerprint capture in such way needs a long time.

SUMMARY OF THE INVENTION

In view of the aforesaid problems in the prior art, technical solutions of the present inventive concept are proposed to shorten the time required for acquiring fingerprint data.

According to an aspect of the present invention, there is provided a self-capacitive fingerprint recognition touch screen, comprising a plurality of fingerprint recognition electrodes, and a plurality of connecting lines which are directly connected to the plurality of fingerprint recognition electrodes, respectively. The connecting lines are used for transferring driving signals and detection signals needed by the fingerprint recognition electrodes.

According to embodiments of the present invention, the plurality of connecting lines may be implemented through different conductive layers.

According to the embodiments of the present invention, the conductive layers may include a first conductive layer, a second conductive layer and a third conductive layer which are different from one another.

According to the embodiments of the present invention, the first conductive layer may be a light blocking layer provided between a base substrate and a buffer layer, the second conductive layer may be a gate layer provided between a gate insulating layer and an interlayer insulating layer, and the third conductive layer may be a source/drain layer provided between the interlayer insulating layer and a planarization layer. The plurality of fingerprint recognition electrodes may be electrically connected to the connecting lines, which are formed in the corresponding conductive layers, through first via holes, second via holes and third via holes, respectively.

According to the embodiments of the present invention, the plurality of fingerprint recognition electrodes may be arranged in a same layer.

According to the embodiments of the present invention, the plurality of fingerprint recognition electrodes may be arranged in a grid formed by a plurality of grid lines which cross horizontally and vertically in a same layer, and the grid lines are grounded.

According to the embodiments of the present invention, the plurality of fingerprint recognition electrodes may be arranged on a planarization layer.

According to another aspect of the present invention, there is provided a manufacturing method of a self-capacitive fingerprint recognition touch screen, comprising sequentially forming a conductive layer and a fingerprint recognition electrode layer insulated from each other on a base substrate, wherein, a connecting line is formed in the conductive layer, and a fingerprint recognition electrode is formed in the fingerprint recognition electrode layer. The manufacturing method further comprises forming a via hole, so that the connecting line formed in the conductive layer is electrically connected with the fingerprint recognition electrode formed in the fingerprint recognition electrode layer through the via hole.

According to another aspect of the present invention, there is provided a manufacturing method of a self-capacitive fingerprint recognition touch screen, comprising: forming a light blocking layer on a base substrate by a patterning process, and forming a first connecting line in the light blocking layer; forming a buffer layer by a patterning process on the base substrate provided with the light blocking layer; forming an active layer by a patterning process on the base substrate provided with the buffer layer; forming a gate insulating layer by a patterning process on the base substrate provided with the active layer; forming a gate layer by a patterning process on the base substrate provided with the gate insulating layer, and forming a second connecting line in the gate layer; forming an interlayer insulating layer by a patterning process on the base substrate provided with the gate layer; forming a source/drain layer by a patterning process on the base substrate provided with the interlayer insulating layer, and forming a third connecting line in the source/drain layer; forming a planarization layer by a patterning process on the base substrate provided with the source/drain layer; forming a first via hole penetrating through the planarization layer, the interlayer insulating layer, the gate insulating layer and the buffer layer, so as to partially expose the first connecting line formed in the light blocking layer; forming a second via hole penetrating through the planarization layer and the interlayer insulating layer, so as to partially expose the second connecting line formed in the gate layer; forming a third via hole penetrating through the planarization layer, so as to partially expose the third connecting line formed in the source/drain layer; forming fingerprint recognition electrodes by a patterning process on the base substrate provided with the planarization layer, so that each fingerprint recognition electrode is electrically connected to any one of the first connecting line, the second connecting line and the third connecting line through the first via hole, the second via hole or the third via hole.

According to another aspect of the present invention, there is provided a display device, comprising the self-capacitive fingerprint recognition touch screen according to the present invention.

In the self-capacitive fingerprint recognition touch screen according to the present invention, an independent connecting line is provided for each fingerprint recognition electrode to transfer a driving signal and a detection signal needed by the fingerprint recognition electrode, so that each fingerprint recognition electrode can be controlled independently, and sensing currents of all the fingerprint recognition electrodes can be detected simultaneously, thereby shortening the time required for acquiring fingerprint data.

BRIEF DESCRIPTION OF THE DRAWINGS

In order to illustrate the technical solutions of the embodiments of the present invention more clearly, the embodiments of the present invention will be described in detail below with reference to the accompanying drawings. It should be understood that the following description is given merely for illustrating the embodiments of the present invention, rather than limiting the scope of the present invention. Those of ordinary skill in the art may make modifications and changes to the embodiments without departing from the scope of the present invention. In the drawings.

DETAILED DESCRIPTION OF THE EMBODIMENTS

In order to make those skilled in the art better understand the technical solutions of the present invention, the present invention will be further described in detail below with reference to the accompanying drawings and specific implementations.

According to an aspect of the present invention, there is provided a self-capacitive fingerprint recognition touch screen, comprising a plurality of fingerprint recognition electrodes, and a plurality of connecting lines which are directly connected with the plurality of fingerprint recognition electrodes, respectively. The connecting lines are used for transmitting driving signals and detection signals needed by the fingerprint recognition electrodes.

Figure 1:
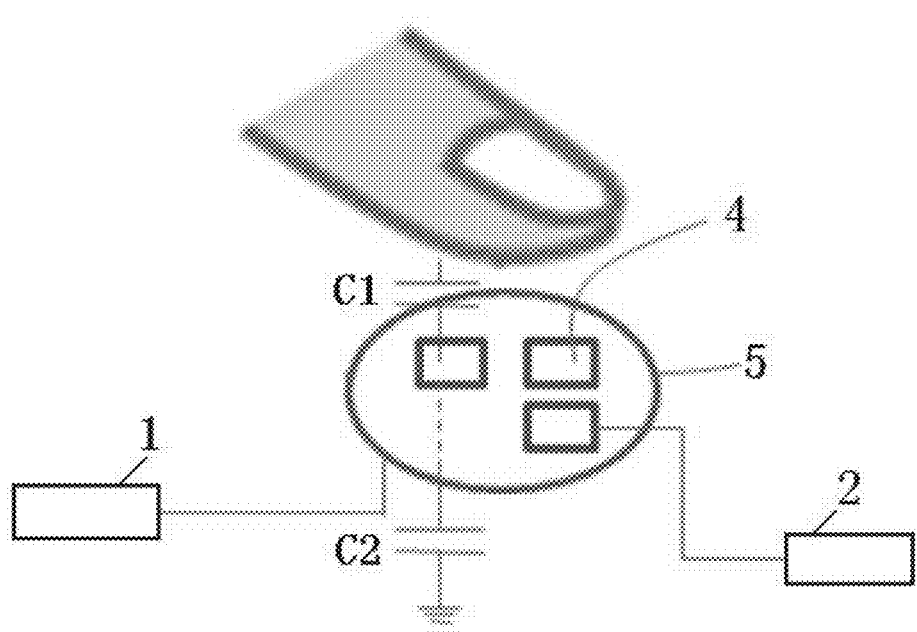
FIG. 1 is a schematic diagram showing principle of fingerprint touch.
Figure 2:
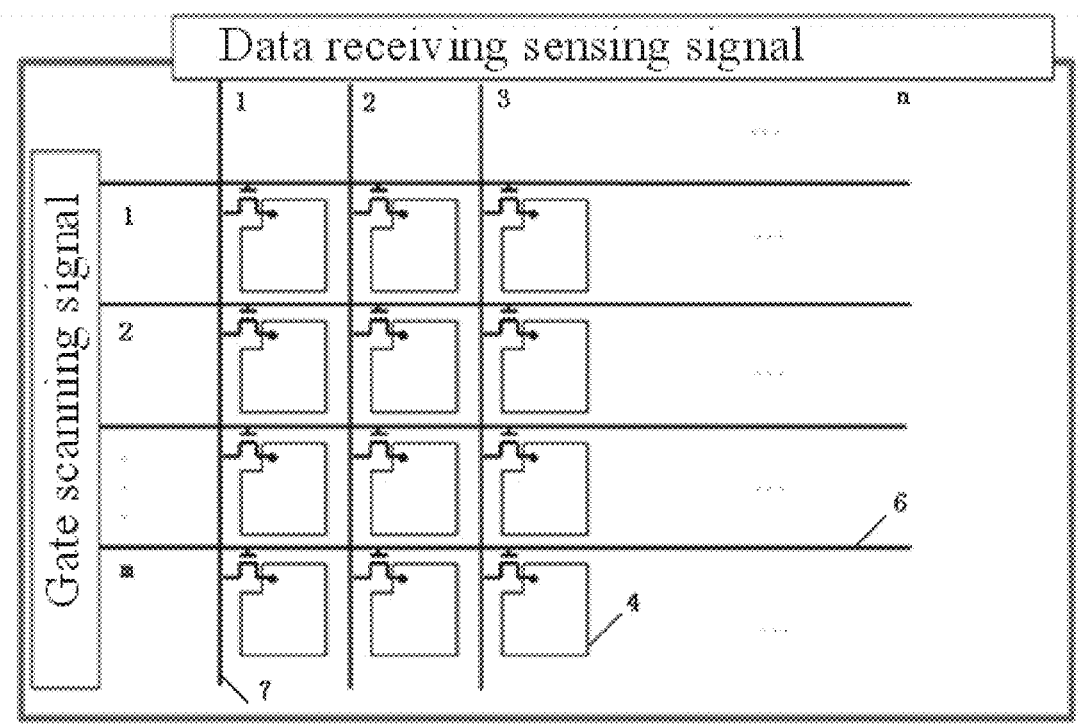
FIG. 2 is a schematic diagram of a fingerprint recognition touch screen in the prior art.
Figure 3:
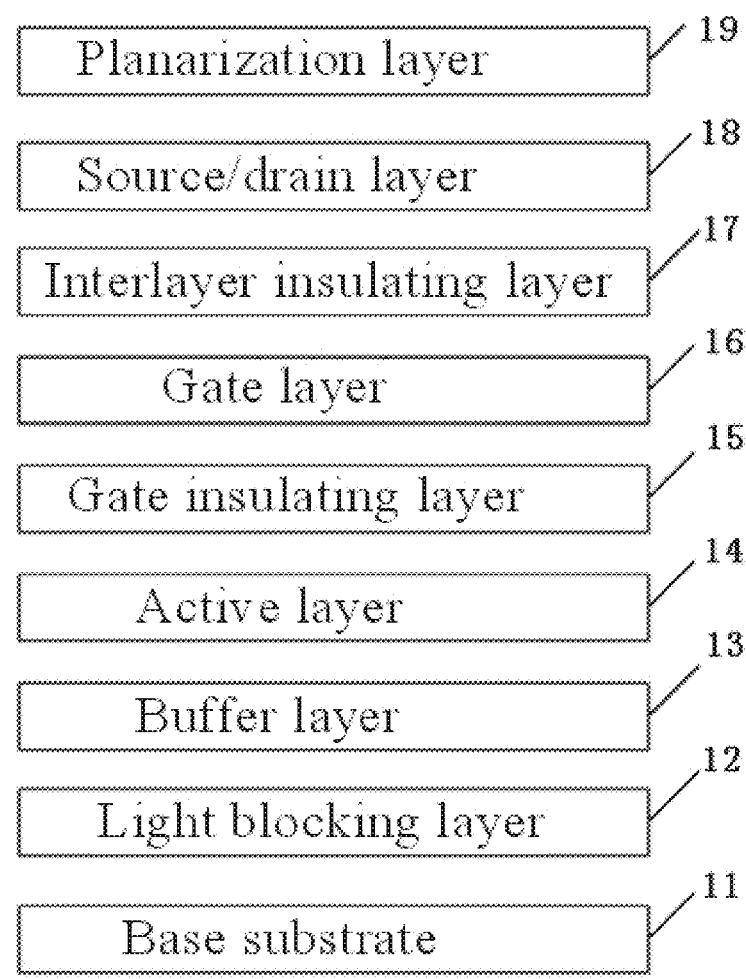
FIG. 3 is a diagram schematically showing configuration of layers of a fingerprint recognition touch screen.

According to embodiments of the present invention, metal layers in a conventional display substrate may be used as conductive layers for implementing the connecting lines which are electrically connected with the fingerprint recognition electrodes directly. FIG. 3 is a diagram schematically showing configuration of layers of a fingerprint recognition touch screen. As shown in FIG. 3, the display substrate generally includes a base substrate 11, a light blocking layer 12, a buffer layer 13, an active layer 14, a gate insulating layer 15, a gate layer 16, an interlayer insulating layer 17, a source/drain layer 18 and a planarization layer 19. The light blocking layer 12, the gate layer 16 and the source/drain layer 18 can be used as the conductive layers for forming the connecting lines.

Figure 4:
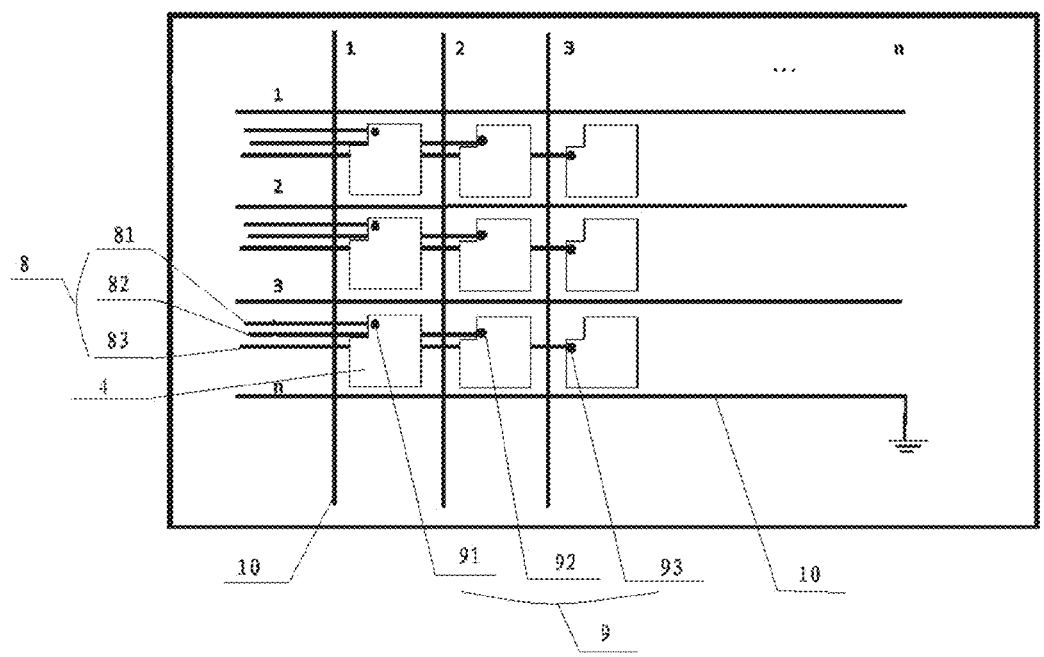
FIG. 4 is a schematic top view of a fingerprint recognition touch screen according to embodiments of the present invention.
Figure 5:
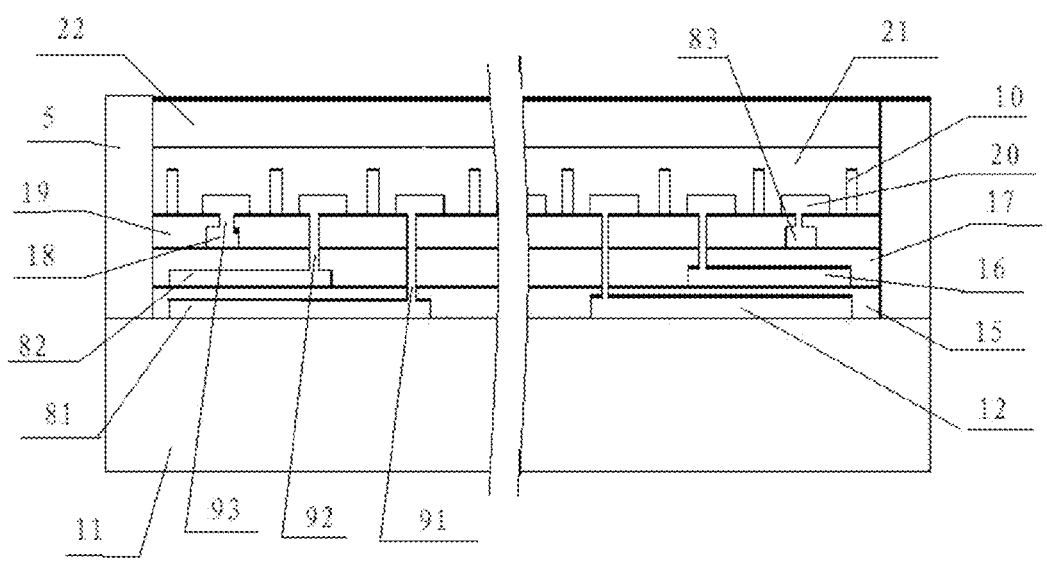
FIG. 5 is a schematic cross-sectional view of a fingerprint recognition touch screen according to the embodiments of the present invention.

FIG. 4 is a schematic top view of a fingerprint recognition touch screen according to embodiments of the present invention, and FIG. 5 is a schematic cross-sectional view of the fingerprint recognition touch screen according to the embodiments of the present invention.

As shown in FIGS. 4 and 5, the self-capacitive fingerprint recognition touch screen according to the embodiments of the present invention comprises a plurality of fingerprint recognition electrodes 4, and a plurality of connecting lines 8 which are directly connected with the plurality of fingerprint recognition electrodes 4, respectively. The connecting lines 8 are used for transmitting driving signals and detection signals needed by the fingerprint recognition electrodes 4.

The connecting lines 8 may include first connecting lines 81 located in a first conductive layer, second connecting lines 82 located in a second conductive layer, and third connecting lines 83 located in a third conductive layer. The fingerprint recognition electrodes 4 are connected with the first connecting lines 81, the second connecting lines 82 and the third connecting lines 83 through first via holes 91, second via holes 92 and third via holes 93, respectively.

As described above, the light blocking layer 12, the gate layer 16 and the source/drain layer 18 of the display substrate can be used as the conductive layers for forming the connecting lines. In this embodiment, the light blocking layer 12 is used as the first conductive layer for forming the first connecting lines 81, the gate layer 16 is used as the second conductive layer for forming the second connecting lines 82, and the source/drain layer 18 is used as the third conductive layer for forming the third connecting lines 83.

According to the embodiments, the connecting lines which are respectively connected to all of the fingerprint recognition electrodes 4 may be distributed uniformly in the three conductive layers, which not only achieves independent control of each fingerprint recognition electrode 4, but also decreases the number of the connecting lines distributed in each conductive layer by implementing the connecting lines in relatively more conductive layers to reduce manufacturing precision, thereby lowering manufacturing cost.

It should be understood that even though the number of the conductive layers illustrated in this embodiment is three, it is practicable that the number of the conductive layers is less than or greater than three.

With reference to FIGS. 3 and 5, the light blocking layer 12 is implemented as the first conductive layer, and is provided between the base substrate 11 and the buffer layer 13. The light blocking layer 12 is provided on the base substrate 11 and is used for preventing leakage current. The active layer 14 (not shown in FIG. 5) is provided on the buffer layer 13 used for preventing impurity particles in the base substrate 11 from penetrating into the active layer 14 during formation of low-temperature polysilicon. In addition, the gate insulating layer 15 is provided on the active layer 14. The base substrate 11 according to the embodiments of the present invention may be a glass substrate.

The gate layer 16 is implemented as the second conductive layer, and is provided between the gate insulating layer 15 and the interlayer insulating layer 17. In addition, the source/drain layer 18 is implemented as the third conductive layer, and is provided between the interlayer insulating layer 17 and the planarization layer 19.

The first via hole 91 is formed to penetrate through the planarization layer 19, the interlayer insulating layer 17, the gate insulating layer 15 and the buffer layer 13, so as to partially expose the first connecting line 81 formed in the light blocking layer 12. The second via hole 92 is formed to penetrate through the planarization layer 19 and the interlayer insulating layer 17, so as to partially expose the second connecting line 82 formed in the gate layer 16. The third via hole 93 is formed to penetrate through the planarization layer 19, so as to partially expose the third connecting line 83 formed in the source/drain layer 18.

A fingerprint recognition electrode layer 20 is formed on the planarization layer 19, so as to form a plurality of fingerprint recognition electrodes 4 arranged in matrix by a patterning process.

According to the embodiments of the present invention, the fingerprint recognition electrodes 4 are arranged in a grid formed by a plurality of grid lines 10 crossing horizontally and vertically in the same layer, and the grid lines 10 are grounded. Such configuration can reduce mutual influence between the fingerprint recognition electrodes 4.

According to another aspect of the present invention, there is provided a manufacturing method of a self-capacitive fingerprint recognition touch screen, comprising sequentially forming a conductive layer and a fingerprint recognition electrode layer insulated from each other on a base substrate, forming a connecting line in the conductive layer, and forming a fingerprint recognition electrode in the fingerprint recognition electrode layer. The manufacturing method further comprises forming a via hole, so that the connecting line formed in the conductive layer is electrically connected with the fingerprint recognition electrode formed in the fingerprint recognition electrode layer through the via hole.

Thereinafter, a manufacturing method of a self-capacitive fingerprint recognition touch screen according to the present inventive concept is described in detail by still taking the structure of the display substrate shown in FIG. 3, in which the light blocking layer 12 is implemented as the first conductive layer, the gate layer 16 is implemented as the second conductive layer, and the source/drain layer 18 is implemented as the third conductive layer, as an example. The method may comprise:

S1: forming a light blocking layer 12 on a base substrate 11 by a patterning process, and forming a first connecting line 81 in the light blocking layer 12;

S2: forming a buffer layer 13 by a patterning process on the base substrate 11 provided with the light blocking layer 12;

S3: forming an active layer 14 by a patterning process on the base substrate 11 provided with the buffer layer 13;

S4: forming a gate insulating layer 15 by a patterning process on the base substrate 11 provided with the active layer 14;

S5: forming a gate layer 16 by a patterning process on the base substrate 11 provided with the gate insulating layer 15, and forming a second connecting line 82 in the gate layer 16;

S6: forming an interlayer insulating layer 17 by a patterning process on the base substrate 11 provided with the gate layer 16;

S7: forming a source/drain layer 18 by a patterning process on the base substrate 11 provided with the interlayer insulating layer 17, and forming a third connecting line 83 in the source/drain layer 83;

S8: forming a planarization layer 19 by a patterning process on the base substrate 11 provided with the source/drain layer 18;

S9: forming a first via hole 91 penetrating through the planarization layer 19, the interlayer insulating layer 17, the gate insulating layer 15 and the buffer layer 13, so as to partially expose the first connecting line 81 formed in the light blocking layer 12;

S10: forming a second via hole 92 penetrating through the planarization layer 19 and the interlayer insulating layer 17, so as to partially expose the second connecting line 82 formed in the gate layer 16;

S11: forming a third via hole 93 penetrating through the planarization layer 19, so as to partially expose the third connecting line 83 formed in the source/drain layer 18; and S12: forming fingerprint recognition electrodes 4 by a patterning process on the base substrate provided with the planarization layer 19, so that each fingerprint recognition electrode 4 is electrically connected to any one of the first connecting line 81, the second connecting line 82 and the third connecting line 83 through the first via hole 91, the second via hole 92 or the third via hole 93.

In addition, the manufacturing method of a self-capacitive fingerprint recognition touch screen may further comprise steps of forming driving electrodes and forming grid lines 10 which cross each other.

In addition, a fingerprint recognition electrode layer 20 may be coated with an adhesive 21 to be adhered to a covering plate 22. The covering plate 22 may be formed as a touch substrate, and other functional layer(s) may also be further formed as required.

According to the manufacturing method of a self-capacitive fingerprint recognition touch screen according to the present invention, fingerprint recognition electrodes can be formed on a large-area base substrate, and the manufacturing cost of the self-capacitive fingerprint recognition touch screen can be reduced because of a relatively low cost of the base substrate (e.g. a glass substrate).

It should be understood that the self-capacitive fingerprint recognition touch screen according to the present invention may be manufactured by a silicon-based process. Because the silicon-based process is a nanoprocess involving fine connecting lines, less conductive layers are needed. However, because the silicon-based process needs to be performed on a silicon wafer, the cost is high and large-area production can hardly be realized.

Figure 6:
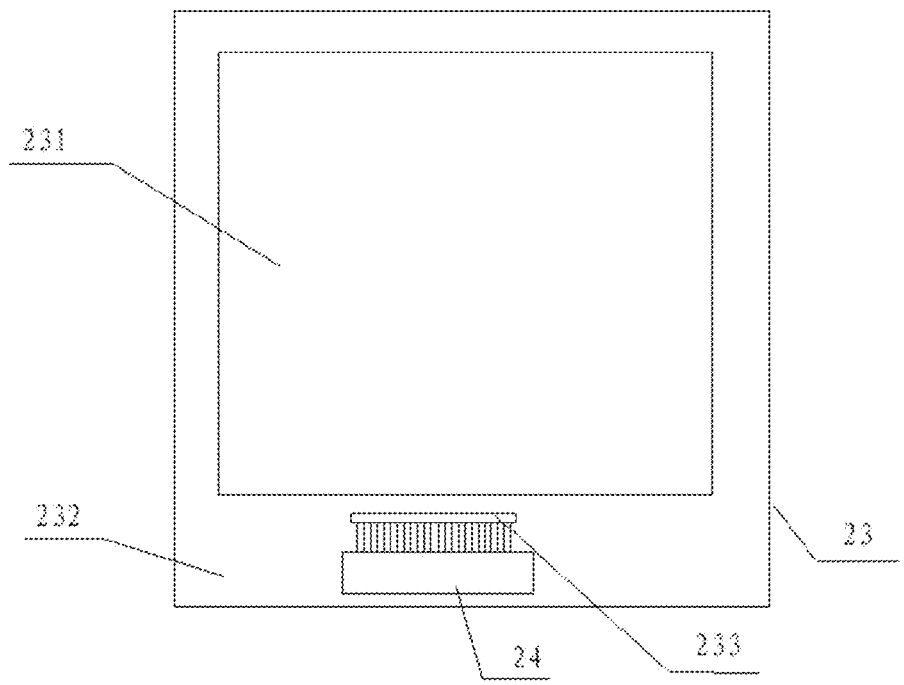
FIG. 6 is a schematic diagram of a display device according to embodiments of the present invention.
Figure 7:
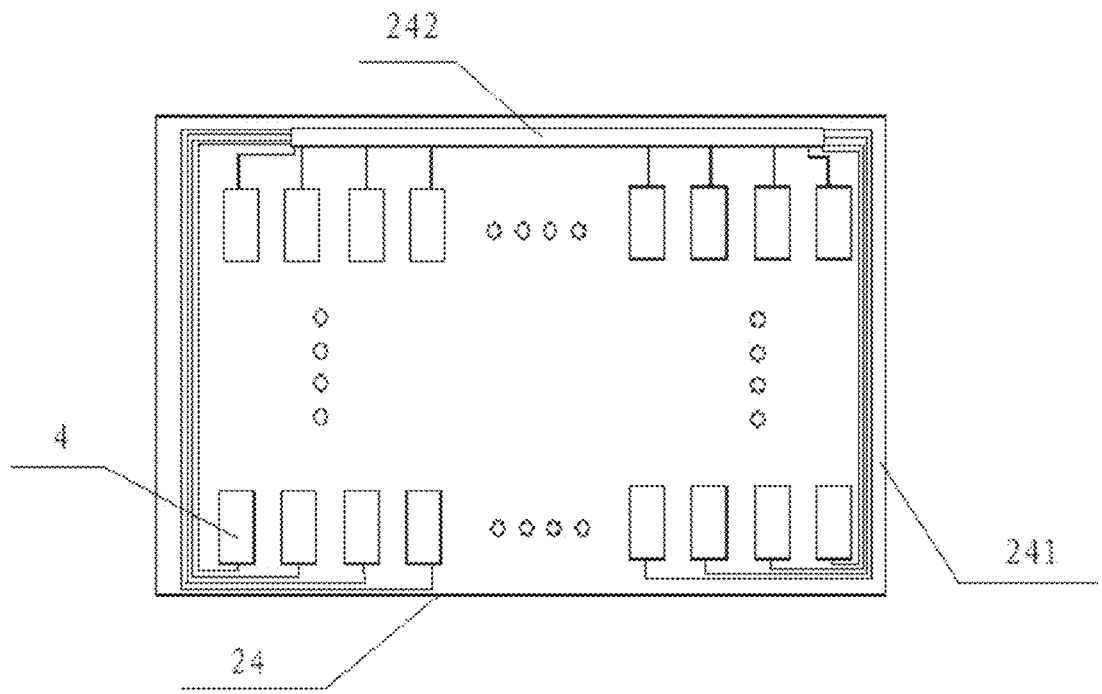
FIG. 7 is a schematic structure diagram of lead wires of a fingerprint recognition touch screen in the display device shown in FIG. 6.

FIG. 6 is a schematic diagram of a display device according to the embodiments of the present invention, and FIG. 7 is a schematic structure diagram of lead wires of a fingerprint recognition touch screen in the display device shown in FIG. 6.

As shown in FIGS. 6 and 7, the display device according to the embodiments of the present invention comprises the self-capacitive fingerprint recognition touch screen according to the present invention. In addition, the display device may further comprise a display panel 23 having a display region 231 and a frame region 232. A display panel integrated circuit 233 is formed in the frame region 232, and each connecting line 8 of the self-capacitive fingerprint recognition touch screen 24 according to the present invention is connected to the display panel integrated circuit 233. Alternatively, a fingerprint recognition touch screen integrated circuit 242 is formed in the frame region 232 (as shown in FIG. 7), and each connecting line 8 of the self-capacitive fingerprint recognition touch screen 24 is connected to the fingerprint recognition touch screen integrated circuit 242.

That is to say, the self-capacitive fingerprint recognition touch screen 24 and the display panel 23 may be manufactured simultaneously, or the self-capacitive fingerprint recognition touch screen 24 may be separately formed on a fingerprint recognition touch screen base substrate 241, and then be adhered to a corresponding position in the frame region 232 of the display panel 23.

For example, each sensing element has a size of 50 $\mu m \times 50$ $\mu m$, so that about 10,000 sensing devices are needed to form a touch region of 5 mm×5 mm, and all the connecting lines of about 10,000 sensing devices need to be led out. The connecting lines may be appropriately grouped and connected to a multiplexer to reduce the number of the connecting lines which need to be led out. However, all the connecting lines may be led out directly (as shown in FIG. 7) in order to simultaneously detect sensing currents of all the sensing elements.

It can be understood that the foregoing implementations are merely exemplary implementations adopted for describing the principle of the present invention, but the present invention is not limited thereto. Those of ordinary skill in the art can make various variations and improvements without departing from the spirit and essence of the present invention, and these variations and improvements shall be considered to fall into the protection scope of the present invention.

The invention claimed is:

1. A self-capacitive fingerprint recognition touch screen, comprising a plurality of fingerprint recognition electrodes, and a plurality of connecting lines which are respectively electrically connected to the plurality of fingerprint recognition electrodes directly, wherein,
   the connecting lines are used for transmitting driving signals and detection signals needed by the fingerprint recognition electrodes,
   wherein, the plurality of connecting lines are implemented through different conductive layers,
   the conductive layers include a first conductive layer, a second conductive layer and a third conductive layer which are different from one another, and
   the first conductive layer is a light blocking layer provided between a base substrate and a buffer layer,
   the second conductive layer is a gate layer provided between a gate insulating layer and an interlayer insulating layer,
   the third conductive layer is a source/drain layer provided between the interlayer insulating layer and a planarization layer, and
   wherein, the plurality of fingerprint recognition electrodes are electrically connected to the connecting lines, which are formed in the corresponding conductive layers, through first via holes, second via holes and third via holes, respectively.

2. The self-capacitive fingerprint recognition touch screen according to claim 1, wherein, the plurality of fingerprint recognition electrodes are arranged in a same layer.

3. The self-capacitive fingerprint recognition touch screen according to claim 1, wherein, the plurality of fingerprint recognition electrodes are arranged in a grid formed by a plurality of grid lines which cross horizontally and vertically in a same layer, and the grid lines are grounded.

4. The self-capacitive fingerprint recognition touch screen according to claim 2, wherein, the plurality of fingerprint recognition electrodes are arranged on a planarization layer.

5. A manufacturing method of a self-capacitive fingerprint recognition touch screen, comprising:
   forming a light blocking layer on a base substrate by a patterning process, and forming a first connecting line in the light blocking layer;
   forming a buffer layer by a patterning process on the base substrate provided with the light blocking layer;
   forming an active layer by a patterning process on the base substrate provided with the buffer layer;
   forming a gate insulating layer by a patterning process on the base substrate provided with the active layer;
   forming a gate layer by a patterning process on the base substrate provided with the gate insulating layer, and forming a second connecting line in the gate layer;
   forming an interlayer insulating layer by a patterning process on the base substrate provided with the gate layer;
   forming a source/drain layer by a patterning process on the base substrate provided with the interlayer insulating layer, and forming a third connecting line in the source/drain layer;
   forming a planarization layer by a patterning process on the base substrate provided with the source/drain layer;
   forming a first via hole penetrating through the planarization layer, the interlayer insulating layer, the gate insulating layer and the buffer layer, so as to partially expose the first connecting line formed in the light blocking layer;
   forming a second via hole penetrating through the planarization layer and the interlayer insulating layer, so as to partially expose the second connecting line formed in the gate layer;
   forming a third via hole penetrating through the planarization layer, so as to partially expose the third connecting line formed in the source/drain layer; and
   forming fingerprint recognition electrodes by a patterning process on the base substrate provided with the planarization layer, so that each fingerprint recognition electrode is electrically connected to any one of the first connecting line, the second connecting line and the third connecting line through the first via hole, the second via hole or the third via hole.

6. A display device, comprising the self-capacitive fingerprint recognition touch screen according to claim 1.

7. The display device according to claim 6, wherein, the plurality of fingerprint recognition electrodes are arranged in a same layer.

8. The display device according to claim 6, wherein, the plurality of fingerprint recognition electrodes are arranged in a grid formed by a plurality of grid lines which cross horizontally and vertically in a same layer, and the grid lines are grounded.

9. The display device according to claim 7, wherein, the plurality of fingerprint recognition electrodes are arranged on a planarization layer.

* * * * *